(No Model.)

J. P. BLACK & T. PATES.
SULKY PLANTING PLOW.

No. 250,048. Patented Nov. 29, 1881.

Witnesses:
E. L. Lane
M. Barker

Inventors.
Joseph P. Black
Thomas Pates.
by John Lane,
Atty

UNITED STATES PATENT OFFICE.

JOSEPH P. BLACK AND THOMAS PATES, OF ALTON, ILLINOIS, ASSIGNORS TO THE HAPGOOD PLOW COMPANY, OF SAME PLACE.

SULKY PLANTING-PLOW.

SPECIFICATION forming part of Letters Patent No. 250,048, dated November 29, 1881.

Application filed July 11, 1881. (No model.)

*To all whom it may concern:*

Be it known that we, JOSEPH P. BLACK and THOMAS PATES, of Alton, in the county of Madison and State of Illinois, have invented a new and useful Improvement in Sulky Planting-Plows, which improvement is fully set forth in the following specification and accompanying drawings.

Our invention relates to improvements in planting-plows.

Our invention consists in the new and improved construction of the shovel drag-bar $d$, and in the yoke $h$, used in attaching the covering-shovels, connecting them and the drill-tooth stock $c$ to the plow, and in the combination, in a planting-plow, of the dropping and planting attachments, arranged as hereinafter shown.

Figure 1:
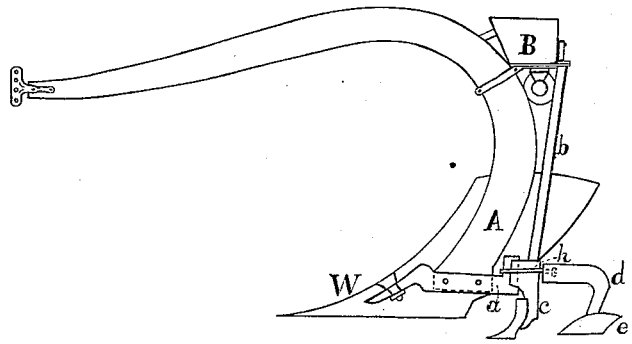
Figure 2:
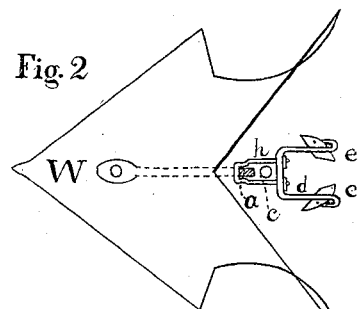
Figure 3:
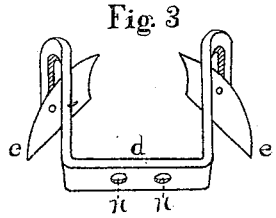
Figure 4:
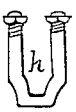

Figure 1 gives a vertical section view of a planting-plow having our improvements shown, also showing the combination of the dropping and planting devices with the bent beam A and plow W. Fig. 2 gives a top view of the same as Fig. 1, having the beam A and dropping device B removed, showing how our improved shovel drag-bar $d$ and yoke $h$ are attached. Fig. 3 is a view, in perspective, of the shovel $e$ and drag-bar $d$, enlarged. Fig. 4 is a view showing how the yoke $h$ is constructed.

Like letters refer to like parts in the several views.

$d$ is our improved drag-bar, consisting of a flat bar of iron bent ⊔ shape, and with its legs bent down, supporting the shovels $e$, and with two perforations, $n$ $n$, in its closed end, as shown in Fig. 3.

$h$ is the yoke, consisting of a bar of iron bent ⊔ shape, with screw-nuts on both of its legs. The closed end is made narrow to fit the upright part of center bar, $a$, and the body is made wider to embrace the sides of the drill-stock $c$, as will be understood by inspecting Fig. 2.

In operation the yoke $h$ is placed in position, as shown in Fig. 2, with its closed end in front of the bar $a$ and its sides embracing the stock $c$, and with its legs extending through the perforations $n$ $n$, and with the screw-nuts tightened against the drag-bar $d$, rigidly securing the stock $c$ and drag-bar $d$ to the bar $a$, and the bar $a$ united to the beam A with bolts or rivets, as shown in Fig. 1.

In Fig. 1 is shown our improved construction and arrangement, in a planting-plow, of the plow W, supporting a bent beam, A, which beam supports and has thereto attached the dropping attachment B, the planting attachments, drill stock or tooth $c$, and the covering-blade drag-bar $d$, which arrangement we have so made to adapt the planting-plow for use on the ordinary plow-sulky, making a sulky planting-plow.

Heretofore in sulky planting-plows the dropping and planting devices have been attached to the sulky-frame or other parts than to the bent plow-beam, and liable to become disarranged and work imperfectly; and it is to overcome the objections and imperfect working of such arrangements that we have improved the arrangement, adapting the parts and combining them with the bent plow-beam A, as herein shown.

W is a listing-plow, and A is the bent plow-beam. B is the dropping-box, attached to the beam A, and $b$ is a pipe, through which corn may drop from the dropping-box to the planting drill-stock. The dropping-box B is attached to the bent plow-beam A by means of a clasp embracing the said beam and adjustable on the said beam, as will be understood by reference to the drawings.

We do not claim, broadly, constructing drag-bars of a single bar.

Having thus described and set forth our invention, we claim—

1. In a planting-plow, the drag-bar $d$, formed of a single piece, bent ⊔ shape, and shovels $e$, attached to the legs of the drag-bar, and the closed end of the drag-bar having the two perforations $n$ $n$, in combination with the yoke $h$, consisting of the ⊔-shape bar having screw-nuts on both its legs, drill-tooth $c$, and center bar, $a$, the yoke $h$ embracing the center bar, $a$, and tooth $c$, and supporting the drag-bar $d$ in position on the rear side of the tooth, as shown.

2. In a planting-plow, the bent plow-beam A, the listing-plow W, supporting said beam, the drill-tooth c, and the drag-bar d, both of the latter connected to the beam A, substantially as shown, in combination with the dropping-box B and pipe b, the box B being attached directly to the beam A by a clasp embracing the beam and adjustable thereon, as shown, and for the purpose specified.

JOSEPH P. BLACK.
THOMAS PATES.

Witnesses:
F. H. FERGUSON,
GEO. A. BLACK.